United States Patent [19]

Locke

[11] 4,173,062
[45] Nov. 6, 1979

[54] METHOD OF FORMING A QUADRIPLANAR COMPONENT

[75] Inventor: Gerald M. Locke, Saco, Me.

[73] Assignee: Corning Glass Works, Corning, N.Y.

[21] Appl. No.: 858,111

[22] Filed: Dec. 7, 1977

Related U.S. Application Data

[62] Division of Ser. No. 714,297, Aug. 16, 1976, Pat. No. 4,097,915.

[51] Int. Cl.² ............................................. H01G 9/24
[52] U.S. Cl. ...................................... 29/570; 29/628; 29/25.42
[58] Field of Search .................. 29/628, 576 S, 25.42, 29/570; 206/330; 361/404, 405, 278

[56] References Cited

U.S. PATENT DOCUMENTS

| | | | |
|---|---|---|---|
| 3,182,276 | 5/1965 | Ruehlemann | 206/330 |
| 3,421,195 | 1/1969 | Berryhill | 29/570 |
| 3,464,051 | 8/1969 | Webb | 29/628 |
| 3,550,228 | 12/1970 | Asscher | 29/25.42 |
| 3,977,522 | 8/1976 | van der Aker et al. | 206/330 |

FOREIGN PATENT DOCUMENTS

51-4562  1/1978  Japan ............................................. 29/589

*Primary Examiner*—C. W. Lanham
*Assistant Examiner*—C. J. Arbes
*Attorney, Agent, or Firm*—Walter S. Zebrowski; Clarence R. Patty, Jr.

[57] ABSTRACT

A quadriplanar capacitor and the method of forming it is disclosed. A capacitor element is disposed within an open ended enclosure and sealed therein, the enclosure forming one capacitor electrode. The open end of the enclosure forms a quadrilateral. A flat electrode member forming the second capacitor electrode is fixedly attached to a lead which itself is rigidly attached to the capacitor element. The flat member is disposed parallel to the enclosure opening and spaced from the enclosure by the lead. The flat member is substantially coextensive with the enclosure opening.

7 Claims, 6 Drawing Figures

U.S. Patent  Nov. 6, 1979  Sheet 1 of 2  4,173,062
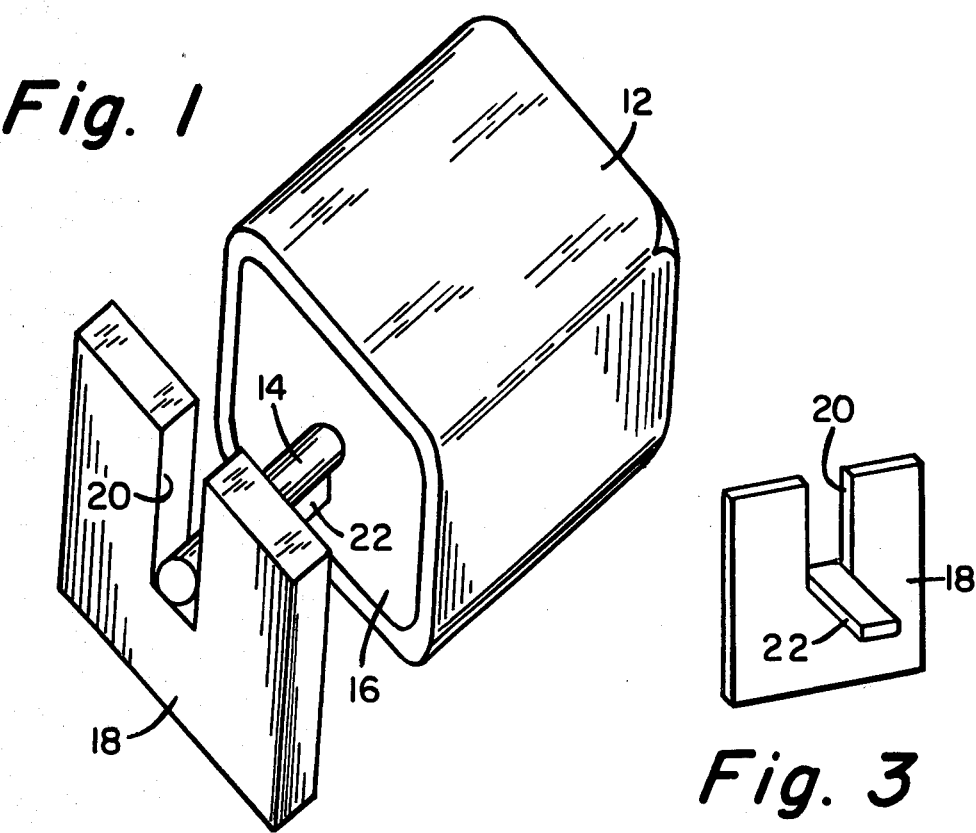
Fig. 1
Fig. 3
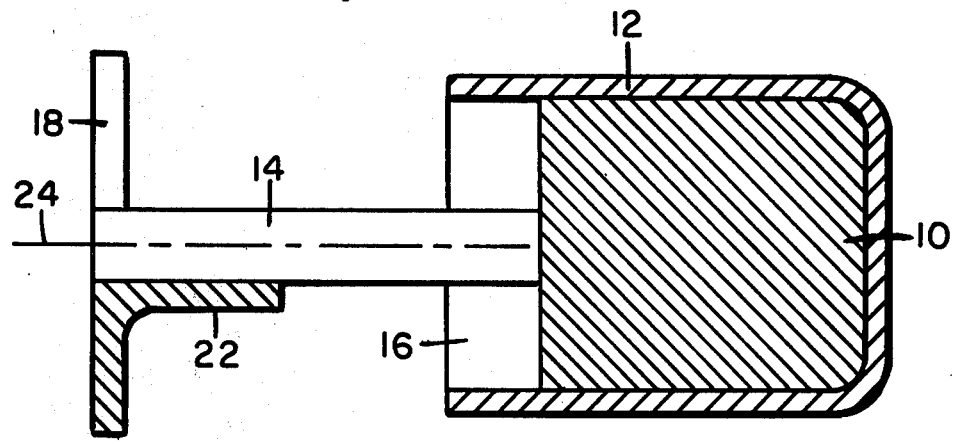
Fig. 2
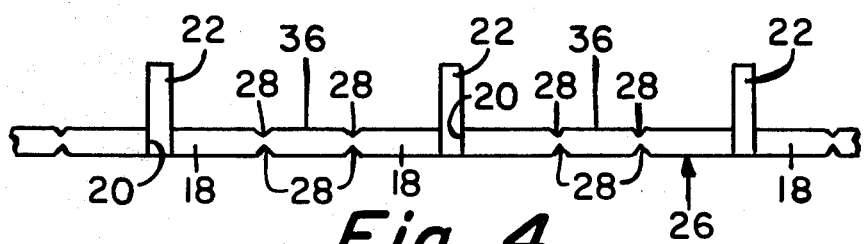
Fig. 4

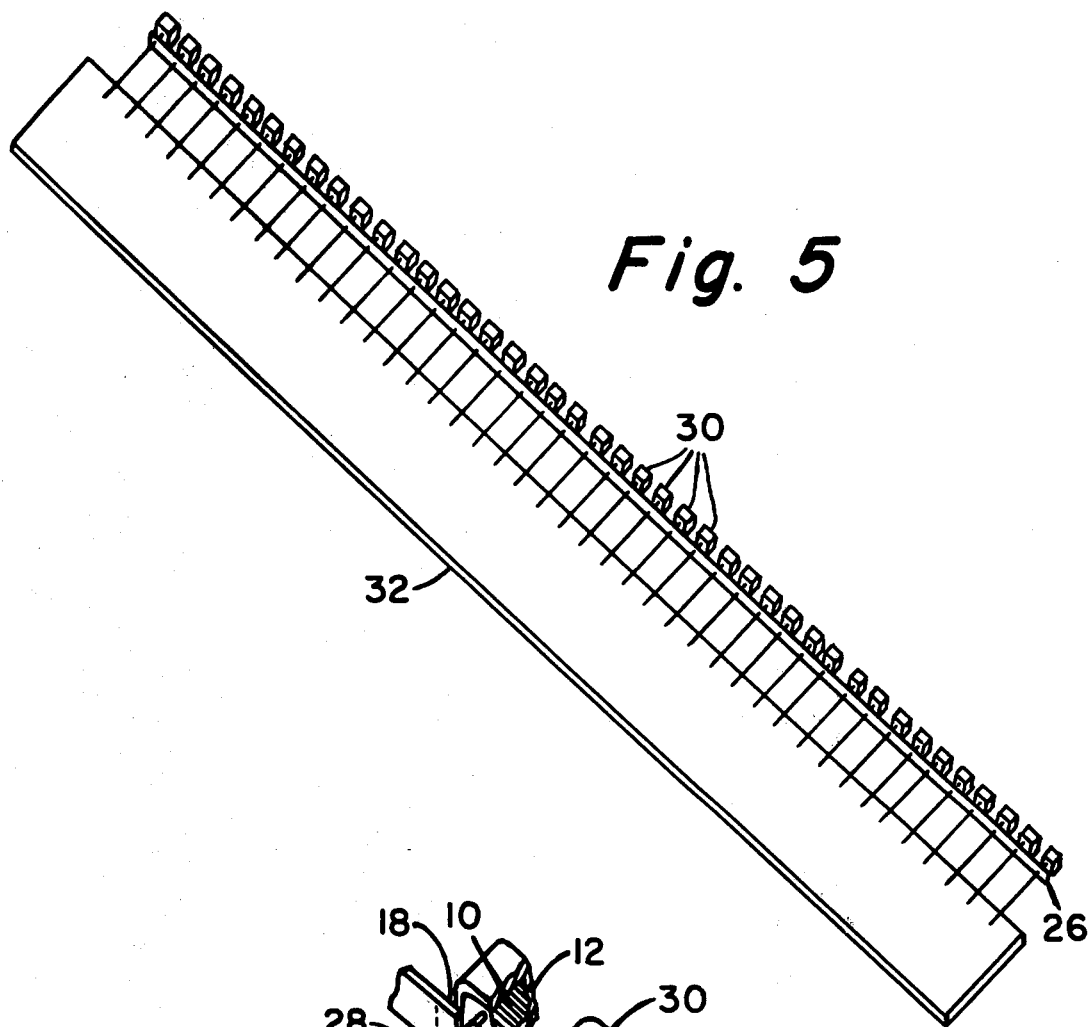
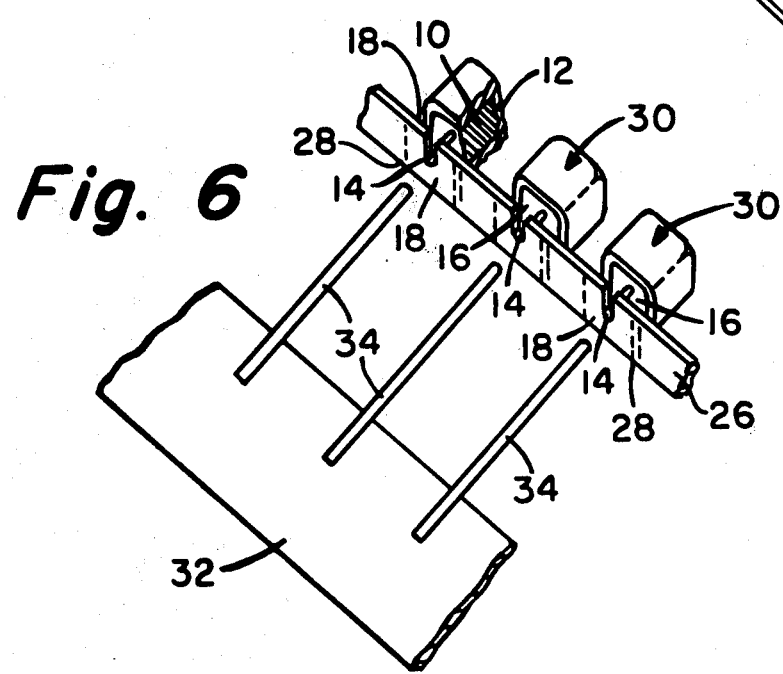

METHOD OF FORMING A QUADRIPLANAR COMPONENT

CROSS-REFERENCE TO RELATED APPLICATION

This is a divisional application of Ser. No. 714,297 filed Aug. 16, 1976, now U.S. Pat. No. 4,097,915 issued June 27, 1978.

BACKGROUND OF THE INVENTION

1. Field of the Invention

This invention relates to planar terminated electrical components, and more particularly to an encapsulated capacitor and method such as solid electrolyte capacitors having planar external terminal connections.

2. Description of the Prior Art

Direct mounting of electrical components, such as solid electrolyte chip capacitors having relatively small size, is particularly useful in thick and thin integrated and hybrid circuitry. Heretofore, capacitors of this type have either been unencapsulated or molded. The unencapsulated capacitors require very careful handling and have weak protruding terminal electrodes. In addition, they are difficult to solder to an electrical circuit without resulting in electrical failures. In the case of molded capacitors, the molding greatly reduces the volumetric efficiency of the capacitor having a given capacitance-voltage relationship.

Connections have been made to the substrate by reflow soldering, brazing, welding or other means. In the past, it has been essential for planar terminals to share the same plane at all times including packaging, handling, and even during the assembly of the components to the terminals. Existing components of the planar type have the problem of positioning on substrates since they can be attached on one plane only, thus making proper orientation indispensible in their use.

SUMMARY OF THE INVENTION

It is an object of the present invention to provide a fully encapsulated planar capacitor which has high volumetric efficiency, does not require component orientation other than polarity orientation during handling or attachment to a circuit, is rugged, and overcomes the heretofore noted disadvantages.

Broadly, according to the present invention, a quadriplanar capacitor is provided having an electrically conductive capacitor enclosure open at one end with the opening defining edge portion of the enclosure forming a quadrilateral, the enclosure being one electrode of the capacitor. A capacitor element with a lead affixed thereto is disposed within the enclosure in an electrical relationship therewith with the lead extending outwardly from the open end substantially perpendicularly to the plane of the quadrilateral. A flat member having flat surfaces substantially corresponding in size and shape to that of the quadrilateral is rigidly attached to the lead so that the plane of the flat member is substantially perpendicular to the longitudinal axis of the lead while the peripheral edges of the flat member are substantially parallel to the opening defining edges of the enclosure. The flat member is spaced from the enclosure by the lead, and the lead and member form the other electrode of the capacitor. The capacitor element may be encapsulated or potted at the open end of the enclosure.

These and additional objects, features and advantages of the present invention will become apparent to those skilled in the art from the following detailed description and the attached drawing, on which by way of example, only the preferred embodiments of this invention are illustrated.

BRIEF DESCRIPTION OF THE DRAWINGS

FIG. 1 is an oblique view of the quadriplanar component of the present invention.

FIG. 2 is a cross-sectional elevation of the quadriplanar component of the present invention.

FIG. 3 is an oblique view of a flat member comprising one electrode of the component of the present invention.

FIG. 4 is a top view illustrating an elongated metallic strip including a plurality of the flat members illustrated in FIG. 3.

FIG. 5 is an oblique view illustrating the method of forming a plurality of quadriplanar components of the present invention.

FIG. 6 is an oblique view illustrating another step of the method of forming the quadriplanar component of the present invention.

DETAILED DESCRIPTION

It is to be noted that the drawings are illustrative and symbolic of the invention and there is no intention to indicate scale of relative proportion of the elements shown therein. Although the present invention will be described in connection with a solid electrolyte tantalum capacitor, the present invention is not limited thereto and is applicable to quadriplanar electrical components in general and the method of their encapsulation.

Referring to FIGS. 1 and 2, there is shown a solid tantalum capacitor element 10 disposed within open ended enclosure 12. Element 10 may be any suitable electronic element such as that illustrated in U.S. Pat. No. 3,850,764 issued to Herczog et al. on Nov. 26, 1974 or as described in copending patent application Ser. No. 673,659 entitled "Process of Forming a Solid Tantalum Capacitor" filed Apr. 5, 1976 by B. S. Aronson et al, both said patent and said application being expressly incorporated herein by reference. Element 10 is disposed within enclosure 12 in an electrical relationship therewith so that electrically conductive enclosure 12 becomes one electrode of the resulting device. Lead 14 is fixedly attached to element 10 for electrical continuity therebetween. Lead 14 may be attached by any means known in the art such for example as welding, soldering, sintering into a body of particles, or the like. As will be understood, the connection between lead 14 and element 10 must be sufficiently rigid so as to provide both electrical continuity as well as physical integrity.

Element 10 is encapsulated within enclosure 12 by encapsulating material 16 to seal the element. Suitable materials for encapsulating material 16 may be epoxies, silicones, plastic resins, or the like. Referring additionally to FIG. 3, there is shown a flat member 18 within which is formed an aperture 20. Flat member 18 has an integral part a transverse member 22 protruding from the planar flat surfaces of member 18. Flat member 18 is fixedly attached to lead 14 by disposing lead 14 within aperture 20 in such manner that the plane of flat member 18 is substantially parallel to the plane of the open end of enclosure 12. Both the open end of enclosure 12 and the flat surfaces of flat member 18 comprise a quadrilateral of substantially the same size and shape. Flat member 18 is attached to lead 14 by soldering, resistance welding, laser welding, or like methods so that its flat surfaces are substantially coextensive with the quadrilateral formed by the open end of container 12 while simultaneously being substantially perpendicular to the longitudinal axis 24 of lead 14. Thus, as will be understood, the aperture formed in flat member 18 must be such as to allow lead 14 to be disposed and located therein to permit member 18 to be substantially coextensive with the opening in enclosure 12. By properly forming member 18 and positioning transverse member 22, lead 14 may be disposed within aperture 20 so that it rests against transverse member 22 permitting proper location of member 18 while simultaneously providing physical support for lead 14. Although aperture 20 has been illustrated in the Figures as an elongated aperture, such shape of an aperture is by no means necessary and any shape of aperture is suitable for the purposes of the present invention so long as it permits the lead to be accommodated and permits the disposition of flat member 18 in such position as heretofore described. After flat member 18 is suitably affixed to lead 14, element 10 is suitably encapsulated and provides the quadriplanar characteristics of the present invention. Lead 14 and flat member 18 comprise one electrode of the component or device, and in an electrolyte capacitor the anode electrode, while enclosure 12 comprises the second or cathode electrode.

As will be understood, a structure as heretofore described permits easy commercial handling as by vibratory feeders, strip feeders, or the like, and can be properly attached to a circuit regardless on which of the four side surfaces of the enclosure 12 the device is ultimately placed on the circuit since each side is in electrical continuity with all other sides while each edge of flat member 18 is in electrical continuity with each other edge and also with lead 14. No orientation during handling or attachment is necessary with the device of the present invention other than polarity orientation.

Referring now to FIG. 4, there is illustrated a strip 26 including a plurality of flat members 18 together with their transverse members 22. Such a strip may be readily manufactured by simply stamping out transverse members 22 which simultaneously form apertures 20. Strip 26 may also be provided with a plurality of breakaway notches or perforations 28 so as to permit a long line of components or a continuous line of components to be formed in a strip and thereafter broken apart for packaging and shipping, or may be shipped as a strip and utilized in that fashion, whereupon, they would be broken apart as needed in the utilization process of the electrical components.

Referring also to FIGS. 5 and 6, there is illustrated a method of forming long strips of capacitor sections. A plurality of solid tantalum capacitor pellets are formed by sintering a quantity of tantalum particles about each of a plurality of tantalum leads and the pellets are thereafter processed to form capacitor elements 10 as described in U.S. Pat. No. 3,850,764. Capacitor elements 10 are then disposed in a plurality of open ended enclosures 12 and sealed therein with encapsulating material permitting only a portion of the leads to extend there beyond comprising capacitor units 30. The ends of extending portions of leads 14 are then spaced apart and the ends are resistance welded to a metal plate 32 to maintain the predetermined desired spacing between capacitor units 30 and to have them all aligned. Plate 32 may be formed of nickel alloy, stainless steel, or the like. A prepared strip 26 having suitable apertures formed therein to accommodate leads 14 and being marked off by a plurality of notches or perforations 28 to permit subsequent breaking apart of strip 26, is disposed intermediate capacitor units 30 and plate 32 with apertures 20 surrounding each respective lead 14. Each transverse member 22 of strip 26 is disposed adjacent each respective lead 14 to provide a means for physical support and subsequent attachment. Each lead 14 is thereafter fixedly attached to permit electrical continuity between each such lead and strip 26 by means of resistance welding, laser welding, soldering, or the like. After strip 26 is attached to each respective lead 14, the excess portion of leads 14 indicated by reference numeral 34 is then sheared off as illustrated in FIG. 6. The remaining portion includes a strip 26 with a plurality of capacitor units 30 electrically connected thereto. Such a strip may be used commercially in strip form wherein the strip may be broken apart or sheared along notches or perforations 28 at the point of utilization or may be broken apart or sheared immediately and packaged and utilized as individual discrete capacitors.

As illustrated in FIG. 4, each flat member 18 is separated by a pair of notches or perforations 28 so that a portion 36 of strip 26 becomes waste material. Such portions 36 may be utilized for engagement with strip utilization machines when such capacitors are used in strip form. That is, portions 36 may for example have apertures therein to accommodate the utilization apparatus whereby strip 26 with the capacitors may be advanced by the utilization apparatus, the capacitor attached to its desired circuit, and the strip broken apart at notches or perforations 28. The strip is thereafter advanced to the next circuit for attachment of the next capacitor in like manner. However, portions 36 are not necessary and, if desired, may be eliminated whereby each flat member 18 is merely separated by a single set of notches or perforations 28 from the next flat member 18, whereby no waste of strip 26 material is caused.

As a typical example, a plurality of capacitor elements formed as described in U.S. Pat. No. 3,850,764 with leads sintered into the pellets were disposed in a plurality of open ended, solder plated brass enclosures so as to fit snugly therein and make electrical contact therewith. The open end of the enclosures forming a quadrilateral were potted or encapsulated by disposing a quantity of epoxy resin therein until the enclosure was substantially filled. The tantalum leads were then equally spaced apart with the ends of the leads contacting a stainless steel plate and the enclosures aligned. The leads were resistance welded to the stainless steel plate to maintain the desired spacing and alignment. Thereafter, a nickel alloy strip as illustrated in FIG. 4 having a plurality of apertures formed therein was disposed intermediate the capacitor units and the stainless steel strip, and resistance welded to the leads so that each flat member portion of the nickel alloy strip was substantially parallel to the plane of the opening of each enclosure and substantially perpendicular to the longitudinal axis of each lead. Strip 26 and consequently each flat member portion thereof was spaced apart from the enclosure. The excess portion of each lead, that is the portion attached to the stainless steel plate was thereafter sheared along the nickel alloy strip separating the strip from the excess portion of the leads. The nickel alloy strip was thereafter broken apart or sheared along notches or perforations formed therein leaving a flat member portion thereof attached to each respective lead. The flat member portions were substantially coextensive with the open end of the enclosure. Each enclosure comprised the cathode electrode of the capacitor while the lead and flat member comprised the anode electrode thereof.

It was found that capacitors as hereinabove described were readily adaptable to vibration feeding wherein all the cathodes and all the anodes would be aligned and were available for attachment to a desired circuit no matter which side of the enclosure nor which edge of the flat member contacted the desired portions of the circuit. No further orientation of any sort was necessary. The components would thereafter be attached to the circuits in any manner well known in the art.

As will be understood, electrical components other than capacitors may also be encapsulated in accordance with this invention. Such components may be resistors, ceramic capacitors and the like.

Although the present invention has been described with respect to details of certain embodiments thereof, it is not intended that such details be limitations upon the scope of the invention except insofar as set forth in the following claims.

I claim:

1. A method of forming a quadriplanar component comprising the steps of
    forming a unitary electrically conductive capacitor enclosure open at one end, the opening defining edge portion of said enclosure forming a quadrilateral, said quadilateral being in one plane said enclosure forming one electrode of said quadriplanar component,
    providing a component element with a lead fixedly attached to said element,
    disposing said component element within said enclosure in electrical relationship therewith with said lead extending outwardly from said open end substantially perpendicularly to the plane of said quadrilateral,
    providing an elongated metallic strip having a plurality of apertures and a plurality of breakaway notches formed therein, each said aperture being intermediate two of said notches, the portions of said strip between said breakaway notches substantially corresponding to the size and shape of said quadrilateral, said apertures being suitable for accommodating said lead,
    disposing the outwardly extending end of said lead in one of said apertures, and
    fixedly attaching said strip to said lead for electrical continuity therebetween, the plane of said strip being substantially parallel to the plane of said quadrilateral and substantially perpendicular to the longitudinal axis of said lead, said lead and said portion of said strip between said notches forming the other electrode of said quadriplanar component.

2. The method of forming the quadriplanar component of claim 1 further comprising the step of breaking said strip along two of said breakaway notches one on each side of the aperture in which said lead is disposed, the portion of said strip attached to said lead being substantially coextensive with said quadrilateral open end of said enclosure and spaced therefrom.

3. The method of forming the quadriplanar component of claim 1 further comprising the step of disposing a quantity of encapsulating material over said element within said open end of said enclosure.

4. The method of forming the quadriplanar component of claim 1 further comprising forming a transverse member adjacent each said aperture in said elongated metallic strip.

5. The method of forming the quadriplanar component of claim 1 further comprising forming means in said elongated metallic strip for engagement with a utilization device.

6. The method of forming the quadriplanar component of claim 1 wherein said lead is fixedly attached to said strip by means of resistance welding.

7. The method of forming the quadriplanar component of claim 1 wherein said component is a capacitor.

* * * * *